US012725943B2

(12) United States Patent
Baltruschat et al.

(10) Patent No.: US 12,725,943 B2
(45) Date of Patent: Sep. 1, 2026

(54) HYBRID CONTACT WITH LABEL CARRIER

(71) Applicant: HARTING ELECTRIC STIFTUNG & CO. KG, Espelkamp (DE)

(72) Inventors: Luca Baltruschat, Minden (DE); Christof Hermoni, Rahden (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 368 days.

(21) Appl. No.: 18/693,509

(22) PCT Filed: Sep. 16, 2022

(86) PCT No.: PCT/DE2022/100693
§ 371 (c)(1),
(2) Date: Mar. 19, 2024

(87) PCT Pub. No.: WO2023/046235
PCT Pub. Date: Mar. 30, 2023

(65) Prior Publication Data

US 2025/0141121 A1 May 1, 2025

(30) Foreign Application Priority Data

Sep. 27, 2021 (DE) ..................... 10 2021 124 867.1

(51) Int. Cl.
*H01R 4/18* (2006.01)
*H01R 9/24* (2006.01)
(Continued)

(52) U.S. Cl.
CPC ........... *H01R 4/185* (2013.01); *H01R 9/2475* (2013.01); *H01R 13/04* (2013.01); *H01R 43/16* (2013.01); *G09F 3/205* (2013.01)

(58) Field of Classification Search
CPC .............................. H01R 4/185; H01R 9/5475
See application file for complete search history.

(56) References Cited

U.S. PATENT DOCUMENTS 3,675,189 A * 7/1972 Smith .................... H01R 13/74
439/825
4,363,180 A 12/1982 Lucas et al.
(Continued)

FOREIGN PATENT DOCUMENTS

CA 2535577 A1 8/2007
DE 29617800 U1 12/1996
(Continued)

OTHER PUBLICATIONS

International Search Report and Written Opinion, mailed Feb. 9, 2023, for 1 International Patent Application No. PCT/DE2022/100693. (12 pages) (with English translation of International Search Report).

(Continued)

*Primary Examiner* — Neil Abrams
(74) *Attorney, Agent, or Firm* — Seed Intellectual Property Law Group LLP

(57) ABSTRACT

A hybrid contact is provided having a first contact part, which is solidly made from metal, and a second contact part in the form of a stamped and bent part, which are connected to each other in a press fit, and wherein a filament connected to a label carrier is fixed in a press fit of the contact parts.

8 Claims, 4 Drawing Sheets

(51) Int. Cl.

| | |
|---|---|
| ***H01R 13/04*** | (2006.01) |
| ***H01R 43/16*** | (2006.01) |
| *G09F 3/20* | (2006.01) |

(56) References Cited

U.S. PATENT DOCUMENTS

| | | | | | |
|---|---|---|---|---|---|
| 5,187,887 | A | | 2/1993 | Mori et al. | |
| 6,004,172 | A | * | 12/1999 | Kerek .................... | H01R 13/04 439/879 |
| 2004/0035029 | A1 | | 2/2004 | Forsberg | |
| 2016/0240974 | A1 | | 8/2016 | Takano | |

FOREIGN PATENT DOCUMENTS

| | | | |
|---|---|---|---|
| DE | 102010040556 | A1 | 3/2012 |
| DE | 112014005002 | T5 | 7/2016 |
| DE | 102016103062 | A1 | 8/2017 |
| DE | 102017128755 | A1 | 6/2019 |
| EP | 0106992 | A1 | 5/1984 |
| JP | H03155086 | A | 7/1991 |
| JP | 2021140993 | A | 9/2021 |

OTHER PUBLICATIONS

Office Action, dated Sep. 9, 2022, for German Patent Application No. 10 2021 124 2 867.1 (8 pages).

International Preliminary Report on Patentability, dated Apr. 2, 2024, for International Patent Application No. PCT/DE2022/100693. (9 pages).

* cited by examiner

HYBRID CONTACT WITH LABEL CARRIER

BACKGROUND

Technical Field

The present disclosure relates to a hybrid contact having a first contact portion which is formed in a solid manner from metal and a second contact portion in the form of a punched/bent component which are connected to each other by a press-fit.

Description of the Related Art

Hybrid contacts are used, for example, to connect a stripped end of an electrically conductive wire to a plug connector. The first contact portion may be a turned component which is made of metal and which is either in the form of a contact pin or a contact bush and which is inserted in a suitable plug connector. The second contact portion may, for example, be a crimp sleeve which is punched and bent or rolled from a metal sheet and which can be crimped to the stripped end of the wire. The first contact portion has at the rear end facing the crimp sleeve a hollow-cylindrical receiving portion in which a substantially C-shape-profiled connection portion of the crimp sleeve can be inserted. There can be concentrically pressed in the receiving sleeve an urging pin which is tapered at the free end. After the connection portion of the crimp sleeve has been inserted into the receiving sleeve, the urging pin is pressed in so that the connection portion is expanded by the tapered end of the urging pin and is pressed against the inner face of the receiving sleeve. Finally, the receiving portion is then held in a press-fit between the urging pin and the wall of the receiving sleeve.

When a conductor bundle comprising a plurality of wires is intended to be connected to the plug connector, it is often advantageous to fit in each case to the individual wires a label carrier on which it is possible to indicate which function the relevant wire has and how it is intended to be connected correctly.

Known label carriers, for example, in the form of a sign which has two lugs, are secured to a portion of the wire, for example, by a cable tie.

BRIEF SUMMARY

Embodiments of the present disclosure are provided to simplify the fitting of label carriers to wires.

In some embodiments, a filament which is connected to a label carrier is fixed to the contact portions of a hybrid contact in a press-fit.

The filament, for example, a textile thread which is fitted to the label carrier, is placed on a second contact portion in such a manner that, during the production of the press-fit, it is squeezed with an end portion between the structures of the contact portions which are in abutment in the press-fit and consequently is itself held in the press-fit. In this manner, the label carrier can be secured in a stable and secure manner to the hybrid contact, which itself is secured to the stripped end of the wire. When the wire is connected to the plug connector, the hybrid contact with the end of the filament being secured thereto is inserted into a contact opening of the plug connector. The label carrier is then movably suspended on an end of the filament which protrudes from the contact opening.

If a plurality of wires which are connected to the same plug connector each have a label carrier, the label carriers which are movably suspended on the filaments are not in the way when the wires are combined to form a compact bundle. By following the filament, it is possible to associate each label carrier clearly with the associated wire.

When the press-fit between the two contact portions of the hybrid contact is produced in the manner described in the introduction using an urging pin, an end of the filament may be placed in the securing portion of the crimp sleeve in such a manner that it bears on the inner face and/or the outer face of this securing portion and, after the urging pin is pressed in, is clamped between this urging pin and the securing portion and/or between the securing portion and the inner face of the receiving sleeve.

In some embodiments, during the subsequent crimping of the crimp sleeve on the wire, the filament may also be crimped in so that the tensile strength of the securing of the filament is increased even further.

The label carrier is, for example, a strip made of plastics material which either has itself a surface which can be written on or can be pushed onto the one covering element which forms the surface which can be written on.

In some embodiments, the filament may be a thin plastics material thread which is formed in one piece with the label carrier. In this instance, the filament at the free end may also have a thickened portion or a lug which enables a temporary securing of the filament to a lug or a hook of the second contact portion before the final securing is carried out when the press-fit is produced.

Embodiments of the present disclosure will be described below in greater detail with reference to the drawings.

DETAILED DESCRIPTION

Figure 1:
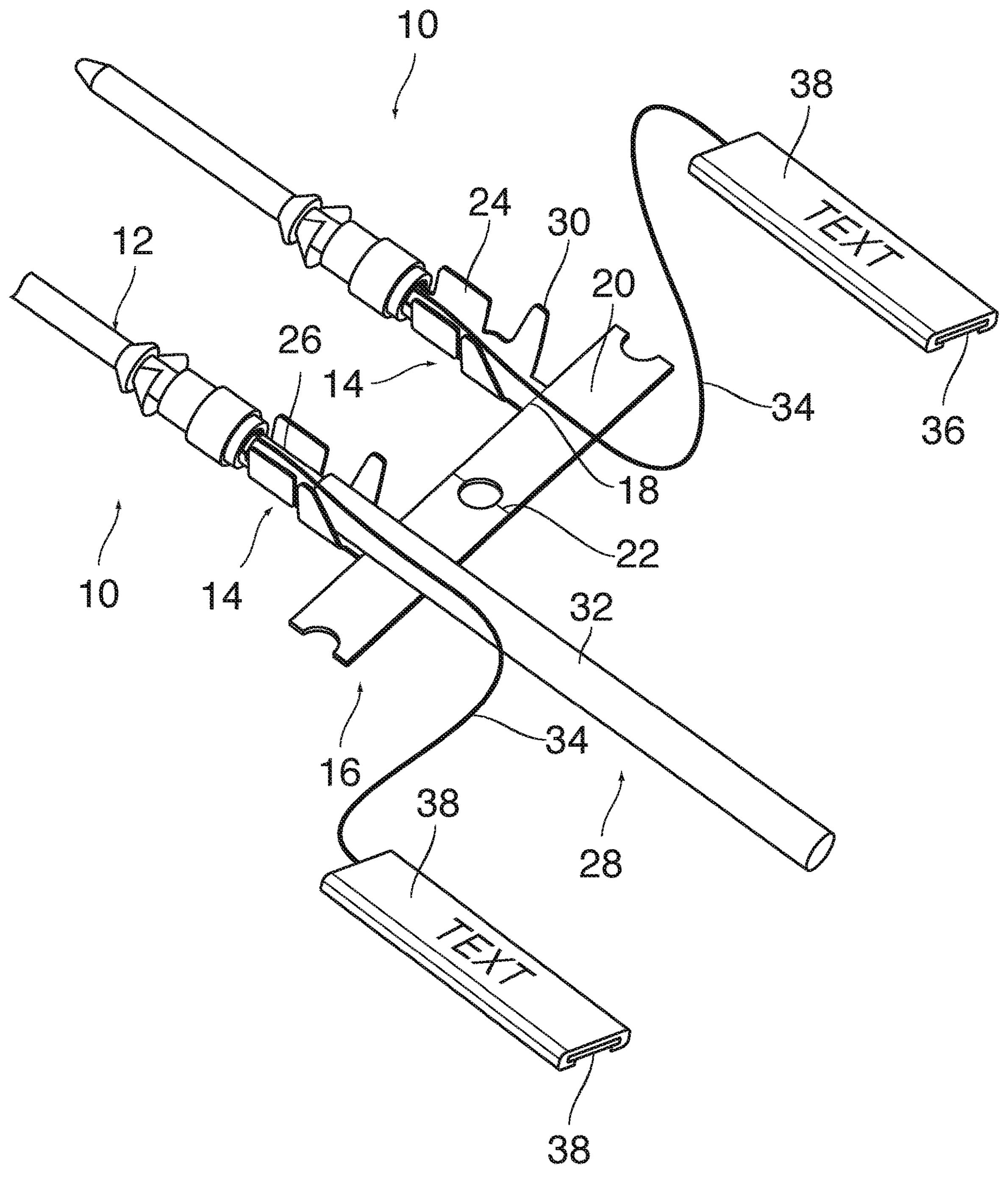
FIG. 1 shows a perspective view of two hybrid contacts.

FIG. 1 shows two hybrid contacts 10 which in each case have a first contact portion, referred to below as a contact pin 12, and a second contact portion, referred to below as a crimp sleeve 14, which are mechanically and electrically connected to each other in a press-fit.

Whilst the contact pins 12 are turned components made of metal, the crimp sleeves 14 are formed from punched/bent components which are made of sheet metal and which in the state illustrated in FIG. 1 are still part of a contact strip 16, which carries a continuous sequence of hybrid contacts 10 which are connected to a carrier strip 20 by desired breaking locations 18. The carrier strip 20 has between each two successive crimp sleeves 14 a transport opening 22 for the band transport.

Each crimp sleeve 14 forms two crimp wings 24 which in the state shown in FIG. 1 diverge in a V-shaped manner and are subsequently closed in an automatic crimp machine around the stripped end 26 of an electrically conductive wire 28. In a state adjacent to the crimp wings 24 there are arranged two pressure relief wings 30 which in FIG. 1 also diverge in a V-shaped manner and which are subsequently closed in the automatic crimp machine around an insulation 32 of the wire 28.

A label carrier 36 is secured to each hybrid contact 10 by a filament 34. The label carrier 36 is in the example shown a flat, elongate strip of plastics material onto which a labelled covering element 38 can be fitted. The filament 34 may, for example, be a textile thread or also a thin plastics material thread which is formed in one piece with the label carrier 36. In any case, one end of the filament 34 is connected to the label carrier 36, whilst the other end in a zone in which the contact pin 12 and the crimp sleeve 14 are connected to each other in a press-fit is also pressed and thereby securely fixed.

Figure 2:
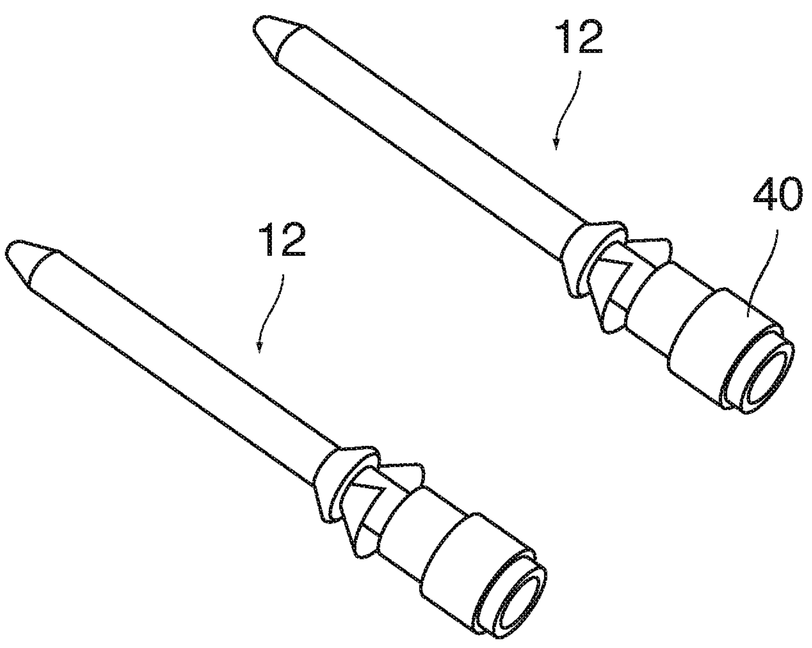
FIGS. 2 and 3 show separate illustrations of portions of the two hybrid contacts according to FIG. 1.

In FIG. 2, the two contact pins 12 from FIG. 1 are illustrated separately. Each contact pin has a receiving sleeve 40 at the rear end facing the crimp sleeve 14.

Figure 3:
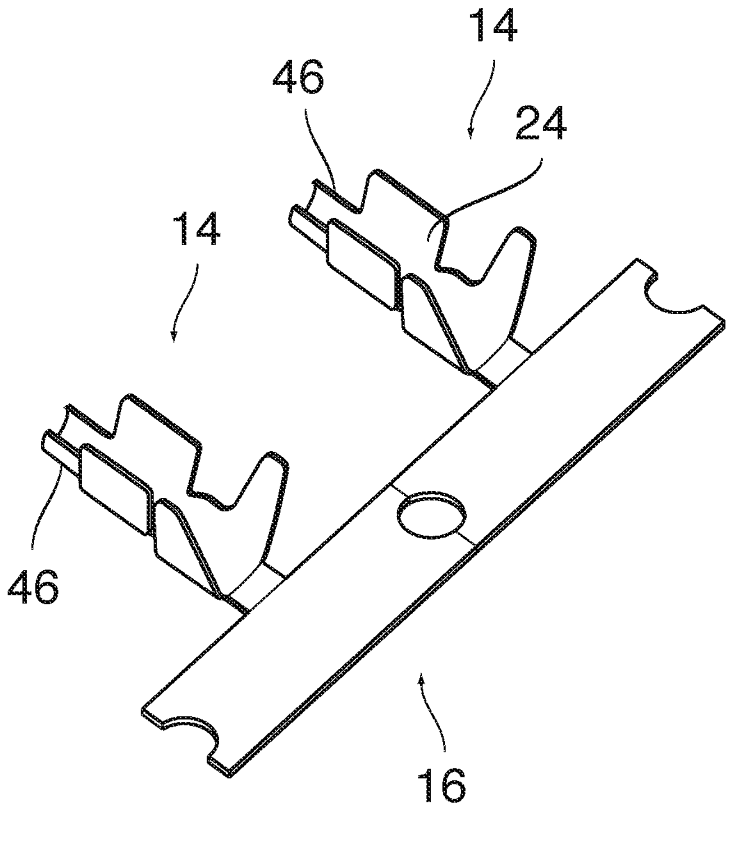

In FIG. 3, the contact strip 16 is illustrated separately with the crimp sleeves 14. Each crimp sleeve 12 forms at the front end a securing portion 46 which adjoins the pair of crimp wings 24 and which has a substantially C-shaped profile. A secure mechanical connection and at the same time a secure electrical connection between the contact pin 12 and the associated crimp sleeve 14 is produced in that the securing portion 46 of the crimp sleeve is fixed with an urging pin 42 (FIG. 4) in the receiving sleeve 40. The securing portion 46 is in this instance expanded by the urging pin 42 and pressed against the inner circumferential face of the receiving sleeve 40.

Figure 4:
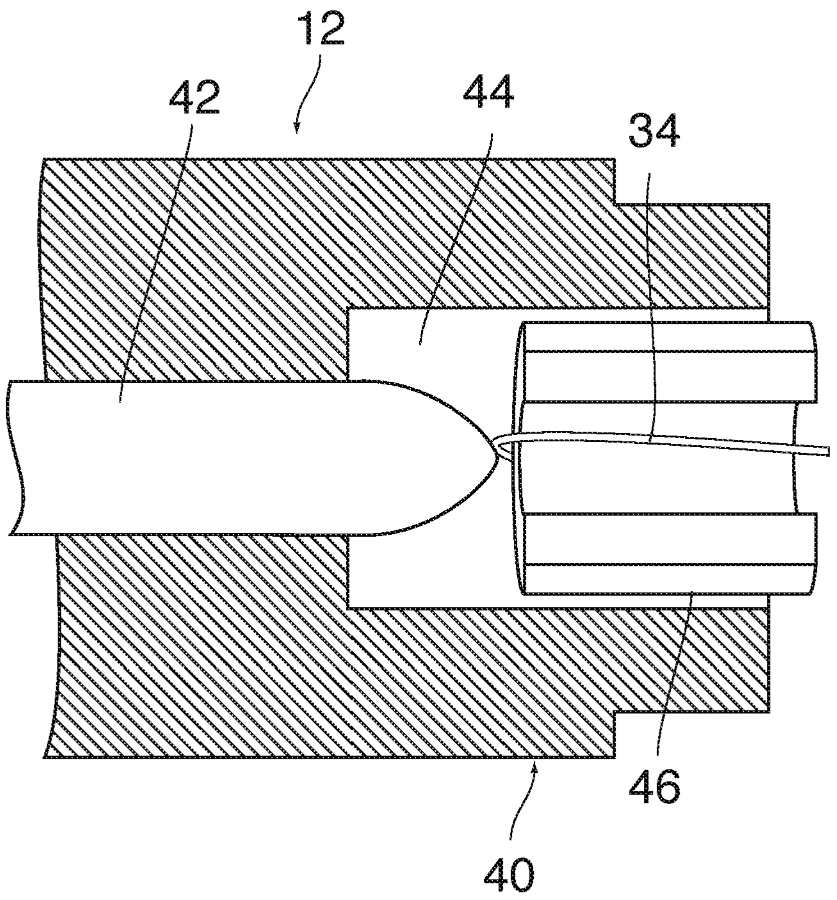
FIG. 4 shows two mutually facing ends of two contact portions in an axial section and a plan view.

In FIG. 4, the rear end of one of the contact pins 12 is illustrated in an axial section. At the same time, in the plan view a front end portion of the securing portion 46 is shown in a position in the receiving sleeve 40. The urging pin 42 is pressed into the securing portion 46 and expands the securing portion 46. The legs of the securing portion 46 are in this instance splayed and pressed against the inner face of the receiving sleeve 40. The filament 34 is placed into the C-shaped profile of the securing portion 46 and guided around the front end of this securing portion toward the outer side. When the urging pin is pressed in, therefore, a portion of the filament 34 is squeezed between the urging pin 42 and the inner face of the securing portion 46, whilst another portion is squeezed between the outer face of the securing portion 46 and the inner face of the receiving sleeve 40. In this manner, a tension-resistant fixing of the filament 34 on the hydraulic contact is achieved.

Figure 5:
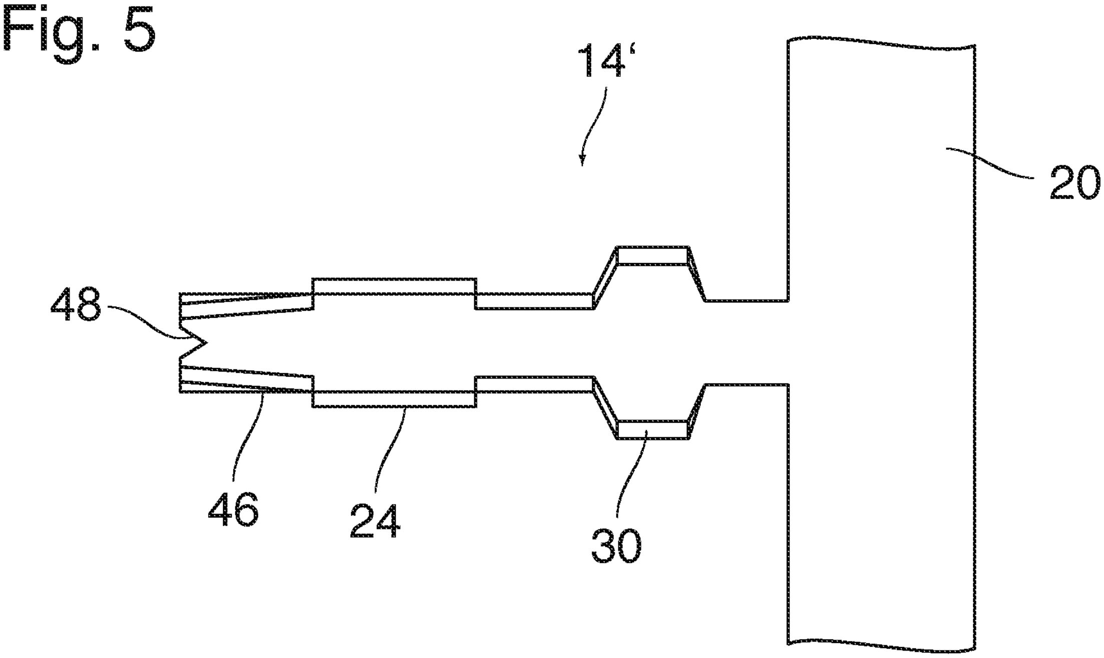
FIG. 5 shows a contact portion according to an alternative embodiment in a plan view.

FIG. 5 shows in the plan view a crimp sleeve 14' in a slightly modified embodiment. It can be seen in this instance that the securing portion 46 tapers slightly toward the front end. In the front edge of this securing portion, in this example a guiding notch 48 for the filament 34 is formed. Prior to pressing the securing portion 46 into the receiving sleeve 40, for example, the filament 34 can be held in a vertical orientation between two grippers which are located above and below the securing portion. When the crimp sleeve 14' is then moved axially toward the receiving sleeve 40, the filament is thus securely retained in the guiding notch 48 so that it does not slide off the end of the securing portion. As soon as the filament is clamped between the urging pin 42, the securing portion 46 and the inner face of the receiving sleeve, the grippers are released so that the filament can be carried more deeply into the annular gap 44.

Figure 6:
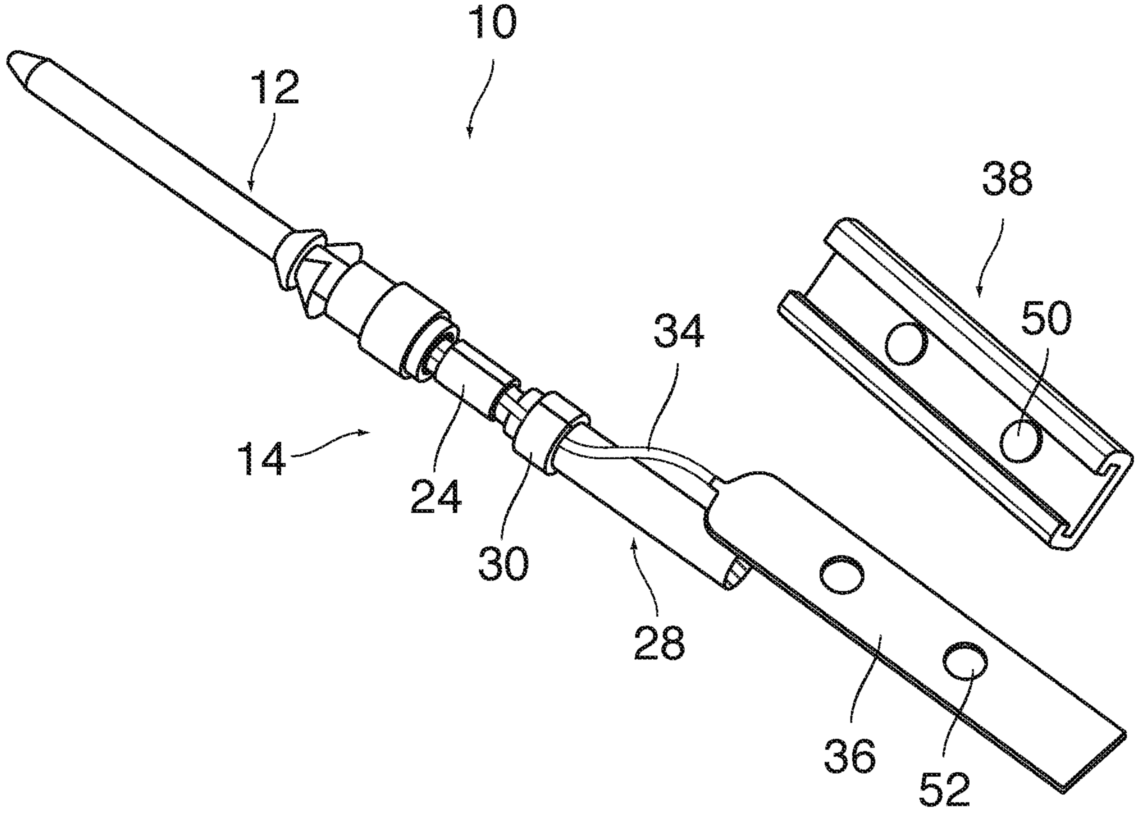
FIG. 6 shows an exploded illustration of a label carrier which is secured to an end of an electrically conductive wire and a covering element for the label carrier.

FIG. 6 shows an individual hybrid contact 10 having a wire 28 and a label carrier 36 after the crimping process has been completed. The crimp wings 24 and the pressure relief wings 30 are now closed tightly around the wire 28 and also surround portions of the filament 34. The covering element 38 which can be fitted with the flanged edges thereof on the label carrier 36 is shown in FIG. 6 separately from the label carrier. The covering element has at the inner side locking humps 50 which after the cover profile has been fitted on the label carrier 36 fall into locking holes 52 of this label carrier and thus fix the covering element in an axial direction on the label carrier. In this embodiment, the label carrier 36 does not need to comprise material which can be written on. Instead, the covering element 38 is labelled so that the labelling can be easily changed if required.

In another embodiment, the labelling can be printed onto a narrow paper strip which is then placed in the covering element 38 and fitted together with the covering element on the label carrier 36. In this instance, the covering element 38 includes transparent material so that the labelling is visible through the covering element. The locking humps 50 can in this case be omitted so that the paper strip can be placed more easily.

Figure 7:
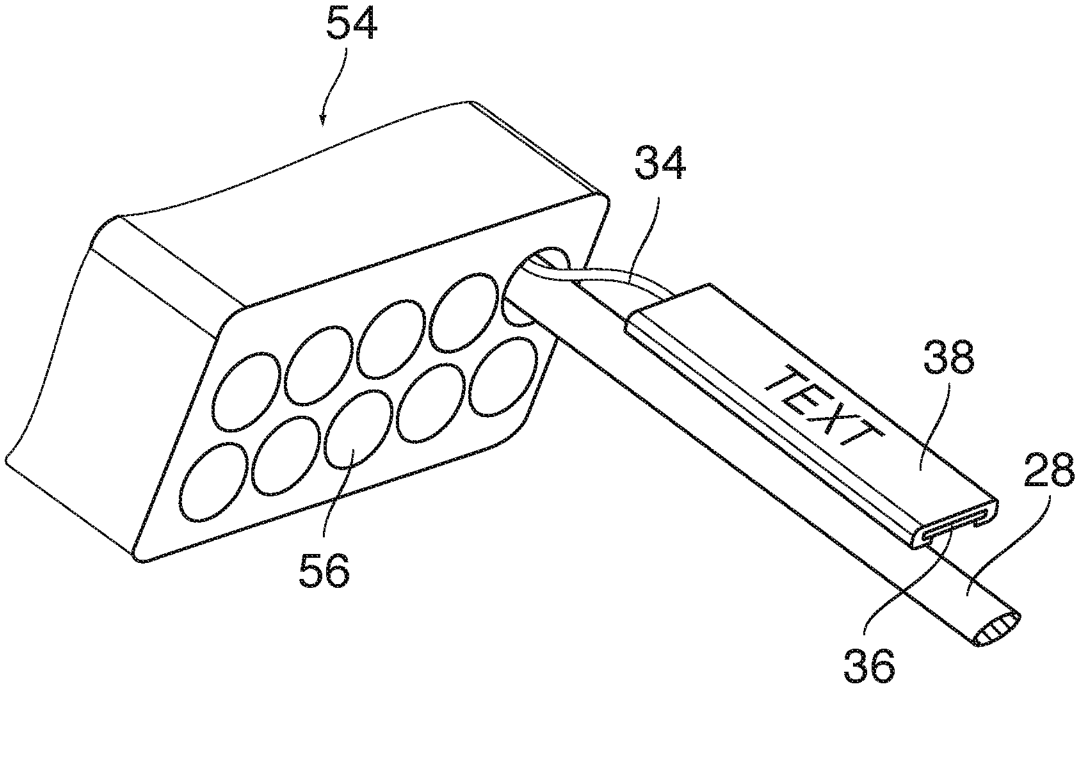
FIG. 7 shows a perspective view of an end of a conductive wire, in which the end is connected to a plug contact and is provided with a label carrier.

FIG. 7 shows an end portion of a plug connector 54 which has at a front side a plurality of contact openings 56 which are arranged in a regular grid. Each contact opening 56 receives a plug bush, which is not shown, and into which one of the hybrid contacts 10 can be inserted in each case. The end of the wire 28 to which this hybrid contact is secured and the filament 34 of the label carrier 30 then protrude from the contact opening. The width of the label carriers 30 is sized in such a manner that the label carriers can be arranged beside each other in a clearly visible manner when each of the contact openings 56 receives a wire. The flexibility of the filaments 34 also enables the label carriers to be arranged with relatively great spacing from the associated wires when the wires are intended to be tightly bundled.

Even though various aspects or features of embodiments of the disclosure are respectively shown in combination in the Figures, it is clear to those skilled in the art that-unless otherwise stated—the combinations shown and discussed are not the only ones possible. In particular, mutually corresponding units or complexes of features from different exemplary embodiments can be exchanged with one another. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A hybrid contact, comprising: having a first contact portion formed in a solid manner from metal; and a second contact portion in the form of a punched and bent component, wherein the first and second contact portions are connected to each other by a press-fit, and wherein a filament connected to a label carrier is fixed to the first and second contact portions in the press-fit.

2. The hybrid contact as claimed in claim 1, wherein one of the first and second contact portions has a receiving sleeve and the other of the first and second contact portions has a securing portion which can be pressed into the receiving sleeve.

3. The hybrid contact as claimed in claim 2, wherein the first contact portion has the receiving sleeve and the securing portion, which is formed on the second contact portion, has a C-shaped profile.

4. The hybrid contact as claimed in claim 3, wherein is an urging pin is arranged coaxially in the receiving sleeve and forms with the receiving sleeve an annular gap and which tapers toward a free end thereof, and wherein the securing portion of the second contact portion is expanded by the urging pin and pressed against the receiving sleeve.

5. The hybrid contact as claimed in claim 3, wherein a portion of the filament is held in a press-fit between the securing portion and an inner circumferential face of the receiving sleeve.

6. The hybrid contact as claimed in claim 4, wherein a portion of the filament is held in a press-fit between the urging pin and the securing portion.

7. The hybrid contact as claimed in claim 3, wherein the second contact portion is a crimp sleeve which surrounds a portion of the filament.

8. The hybrid contact as claimed in claim 1, wherein the label carrier is a material strip on which a covering element can be releasably fitted.

* * * * *